United States Patent
Dorsey

(10) Patent No.: US 8,600,332 B2
(45) Date of Patent: Dec. 3, 2013

(54) ELECTRONIC DEVICES HAVING INTERFERERS ALIGNED WITH RECEIVER FILTERS

(75) Inventor: John G. Dorsey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 917 days.

(21) Appl. No.: 12/752,058

(22) Filed: Mar. 31, 2010

(65) Prior Publication Data

US 2011/0244821 A1    Oct. 6, 2011

(51) Int. Cl.
*H04B 1/10*    (2006.01)
*H04B 15/06*    (2006.01)

(52) U.S. Cl.
USPC ........ 455/317; 455/151.3; 455/255; 455/258; 455/310; 455/318

(58) Field of Classification Search
USPC .............. 455/317, 151.3, 255, 258, 310, 318, 455/130, 141, 151.4, 154.1, 196.1, 208, 455/259, 260, 265, 296, 316
See application file for complete search history.

(56) References Cited

U.S. PATENT DOCUMENTS

| | | | |
|---|---|---|---|
| 5,159,711 A | 10/1992 | Ma et al. | |
| 5,680,418 A | 10/1997 | Croft et al. | |
| 5,838,740 A | 11/1998 | Kallman et al. | |
| 6,509,800 B2 * | 1/2003 | Stockton | 331/11 |
| 6,570,909 B1 | 5/2003 | Kansakoski et al. | |
| 6,636,575 B1 * | 10/2003 | Ott | 375/376 |
| 6,914,949 B2 * | 7/2005 | Richards et al. | 375/346 |
| 7,209,716 B2 * | 4/2007 | Maeda et al. | 455/119 |
| 8,290,448 B2 * | 10/2012 | Cowley et al. | 455/77 |
| 8,406,722 B2 * | 3/2013 | Roy | 455/296 |
| 8,417,983 B2 * | 4/2013 | Machnicki et al. | 713/500 |
| 2003/0198307 A1 * | 10/2003 | Neill et al. | 375/346 |
| 2005/0190867 A1 * | 9/2005 | Sobchak et al. | 375/346 |
| 2007/0047681 A1 * | 3/2007 | Chan et al. | 375/350 |
| 2012/0147929 A1 * | 6/2012 | Malaga et al. | 375/147 |

* cited by examiner

*Primary Examiner* — Pablo Tran
(74) *Attorney, Agent, or Firm* — Treyz Law Group; G. Victor Treyz; David C. Kellogg

(57) ABSTRACT

Electronic devices contain radio-frequency receivers such as direct conversion receivers. A receiver may receive radio-frequency antenna signals from an antenna in an electronic device. The receiver may include notch filters that attenuate signals in the center of the communications channel that is being received by the receiver. An electronic device may include a clock source. The clock source may be used to clock electrical components in the electronic device. During operation, the clock source may produce radio-frequency interference signals at an associated interferer frequency. The potential for the interference signals to disrupt operation of the receiver can be reduced by configuring the electronic device so that the interferer frequency is aligned with the center of the communications channel. The clock source may be adjusted dynamically to accommodate changes in the communications channel.

15 Claims, 7 Drawing Sheets

ELECTRONIC DEVICES HAVING INTERFERERS ALIGNED WITH RECEIVER FILTERS

BACKGROUND

This relates to electronic devices with clocks and other radio-frequency interference sources, and more particularly, to ways in which to align interference sources with receiver filters to reduce undesired radio-frequency interference.

Electronic devices are often provided with wireless communications capabilities. For example, electronic devices may contain cellular telephone network transceiver circuitry for supporting long-range wireless links with cellular network base stations. Electronic devices may also use short-range wireless communications links. For example, electronic devices may communicate in wireless local area network bands at 2.4 GHz and 5 GHz (e.g., using IEEE 802.11 standards) and may communicate using Bluetooth® links at 2.4 GHz.

Devices that operate in wireless communications bands include radio-frequency transceiver circuits. These circuits, which are sometimes referred to as radios, may be used to handle transmitted and received signals in one or more radio-frequency bands of interest.

Electronic devices also have other components such as displays, processors, and memory. Clock circuits are used to distribute a common time reference to these components. For example, a crystal oscillator may be used to generate a reference clock signal. Clock circuitry may be used to create clock signals such as square waves from the output of the crystal oscillator. For example, a phase-locked loop circuit may be used to create a clock signal at a multiple of the crystal oscillator's frequency.

A clock that operates at a given frequency f may produce signals at harmonic frequencies (e.g., fundamental harmonic f and higher order harmonics 2 f, 3 f, 4 f, 5 f, etc.). In a given electronic device, these harmonic frequencies may overlap with the frequencies of other signals in the device such as the frequencies used by radio-frequency transceiver circuitry. If care is not taken to properly isolate these overlapping signals, the device may not operate properly.

As a result of the potential for undesirable signal collisions, extensive consideration is given to proper electromagnetic shielding in modern electronic devices. This typically entails providing additional electronic components in a device whose purpose is to reduce the impact of signal collisions. For example, certain components may be electromagnetically shielded by mounting the components within conductive enclosures. Signal interference can also be minimized by using filter networks.

These schemes generally help to reduce signal collisions between clock sources and component operating frequencies. Nevertheless, there can be penalties associated with shielding schemes. Metal enclosures consume valuable space and add cost and complexity to a device. Particularly in small-form-factor devices, there may be insufficient space for a conductive enclosure. Filtering components may add undesirable cost to a design and must be carefully selected to avoid adversely affecting device reliability.

It would therefore be desirable to provide ways in which to reduce the adverse impact of potential signal collisions in electronic devices with wireless communications circuitry.

SUMMARY

Electronic devices may be provided that contain radio-frequency receivers. The receivers may be direct conversion receivers. A receiver may receive radio-frequency antenna signals from an antenna. The receiver may include notch filters that attenuate signals in the center of the communications channel that is being received.

An electronic device may include a clock source. The clock source may be used to clock electrical components in the electronic device. During operation, the clock source may produce radio-frequency interference signals at an associated interferer frequency. The potential for the interference signals to disrupt operation of the receiver can be reduced by configuring the electronic device so that the interferer frequency is aligned with the center of the communications channel.

The clock source may contain an adjustable phase-locked loop circuit or other adjustable clock circuitry. A control circuit can monitor which communications channel is being received by the receiver and can determine the location of the center frequency of the current channel. The control circuit can make dynamic adjustments to the clock source to ensure that the interferer frequency is located out of the current communications channel or is aligned with the center frequency. When aligned with the center frequency, the notch filters in the receiver attenuate the interference signal.

Further features of the invention, its nature and various advantages will be more apparent from the accompanying drawings and the following detailed description of the preferred embodiments.

DETAILED DESCRIPTION

This relates generally to electronic devices, and more particularly, to electronic devices in which interference signals that may potentially cause undesirable radio-frequency signal interference are placed at frequencies where interference is reduced or eliminated.

Interference may be minimized using a hardwired approach in which signal interference sources are configured to produce signals of particular frequencies. Dynamic adjustments are also possible. For example, an electronic device may be provided with adjustable clock sources. The adjustable clock sources may include adjustable clock generation circuits based on circuits such as adjustable phase-locked loops and adjustable clock relay circuits (e.g., dividers).

The electronic devices in which the clock signals are adjusted may be any suitable type of electronic equipment. For example, the electronic devices may include computers such as laptop computers, desktop computers, computers that are integrated into computer monitors, processing equipment that is part of a set-top box, handheld computers, tablet computers, etc. The electronic devices generally have wireless communications circuitry and are therefore sometimes referred to as wireless electronic devices.

Wireless electronic devices may or may not be portable. An example of a wireless electronic device that may not be considered portable is a large computer with a wireless card. Examples of wireless electronic devices that may be considered portable are portable electronic devices such as laptop computers or small portable computers of the type that are sometimes referred to as ultraportables.

Portable electronic devices may also be somewhat smaller devices. Examples of smaller portable electronic devices include wrist-watch devices, pendant devices, headphone and earpiece devices, and other wearable and miniature devices. With one suitable arrangement, which is sometimes described herein as an example, the portable electronic devices are tablet devices or handheld electronic devices.

Portable electronic devices may include, for example, cellular telephones, media players with wireless communications capabilities, handheld computers (also sometimes called personal digital assistants), remote controllers, global positioning system (GPS) devices, and handheld gaming devices. Portable devices may also include hybrid devices that combine the functionality of multiple devices of these types. Examples of hybrid handheld devices include a cellular telephone that includes media player functionality, a gaming device that includes a wireless communications capability, a cellular telephone that includes game and email functions, and a handheld device that receives email, supports mobile telephone calls, has music player functionality and supports web browsing. These are merely illustrative examples.

Figure 1:
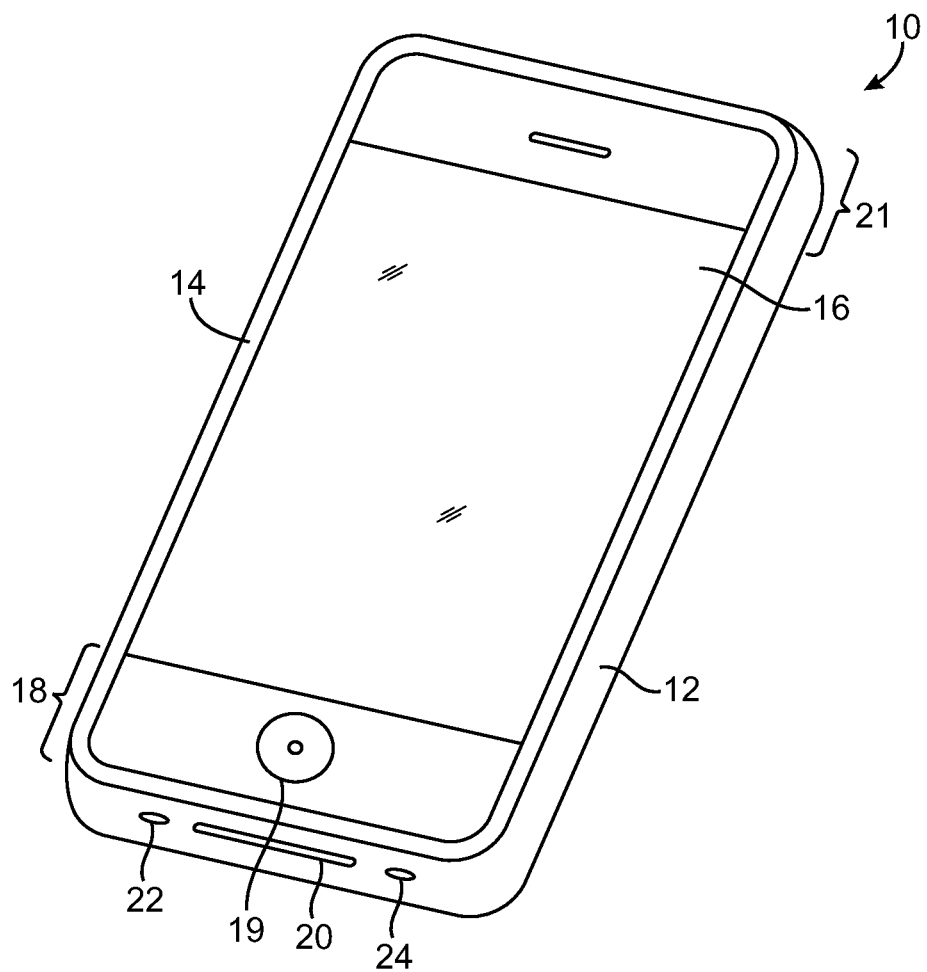
FIG. 1 is a perspective view of an illustrative electronic device in accordance with an embodiment of the present invention.

An illustrative electronic device is shown in FIG. 1. Device 10 of FIG. 1 may be any suitable portable or handheld electronic device.

Device 10 may have housing 12 and may include one or more antennas for handling wireless communications. Device 10 may handle communications over multiple communications bands. For example, wireless communications circuitry in device 10 may be used to handle cellular telephone communications in one or more frequency bands and data communications in one or more communications bands.

Device 10 may, for example, have one or more antennas that handle communications in a 2.4 GHz communications band (e.g., IEEE 802.11 and/or Bluetooth® frequencies) and/or a 5 GHz communications band (e.g., IEEE 802.11). Antennas in device 10 may also handle Global Positioning Systems (GPS) communications, cellular telephone communications, etc.

Housing 12 may be formed of any suitable materials including plastic, glass, ceramics, metal, other suitable materials, or a combination of these materials. Housing 12 may have a bezel 14 that serves to hold display 16 to housing 12. Display 16 may be a liquid crystal display (LCD) or other suitable display. If desired, handheld electronic device 10 may have other input-output devices. For example, handheld electronic device 10 may have user input control devices such as button 19, and input-output components such as port 20 and one or more input-output jacks (e.g., for audio and/or video). Openings 24 and 22 may, if desired, form microphone and speaker ports.

Handheld electronic device 10 may have one or more antennas. For example, handheld electronic device may have a first antenna that is located in the upper end of device 10 in region 21 and a second antenna that is located in the lower end of device 10 in region 18. Additional antennas or only a single antenna may be used in device 10 if desired.

Antennas can be shared or used individually. For example, two or more radio-frequency (RF) transceivers (radios) may share a single antenna. This type of arrangement reduces the number of antennas that are required to support a given number of communications bands. For example, an antenna may be shared by IEEE 802.11 and Bluetooth® transceivers operating at 2.4 GHz. The two or more transceivers that share an antenna in this way may operate in a common communications band (e.g., 2.4 GHz) or may operate in multiple communications bands. As another example, transceiver circuitry may be coupled to multiple antennas (e.g., to implement an antenna diversity arrangement or a multiple-input-multiple output antenna scheme). Arrangements in which some antennas are shared and some antennas are dedicated to use by respective transceivers may also be used in device 10.

Figure 2:
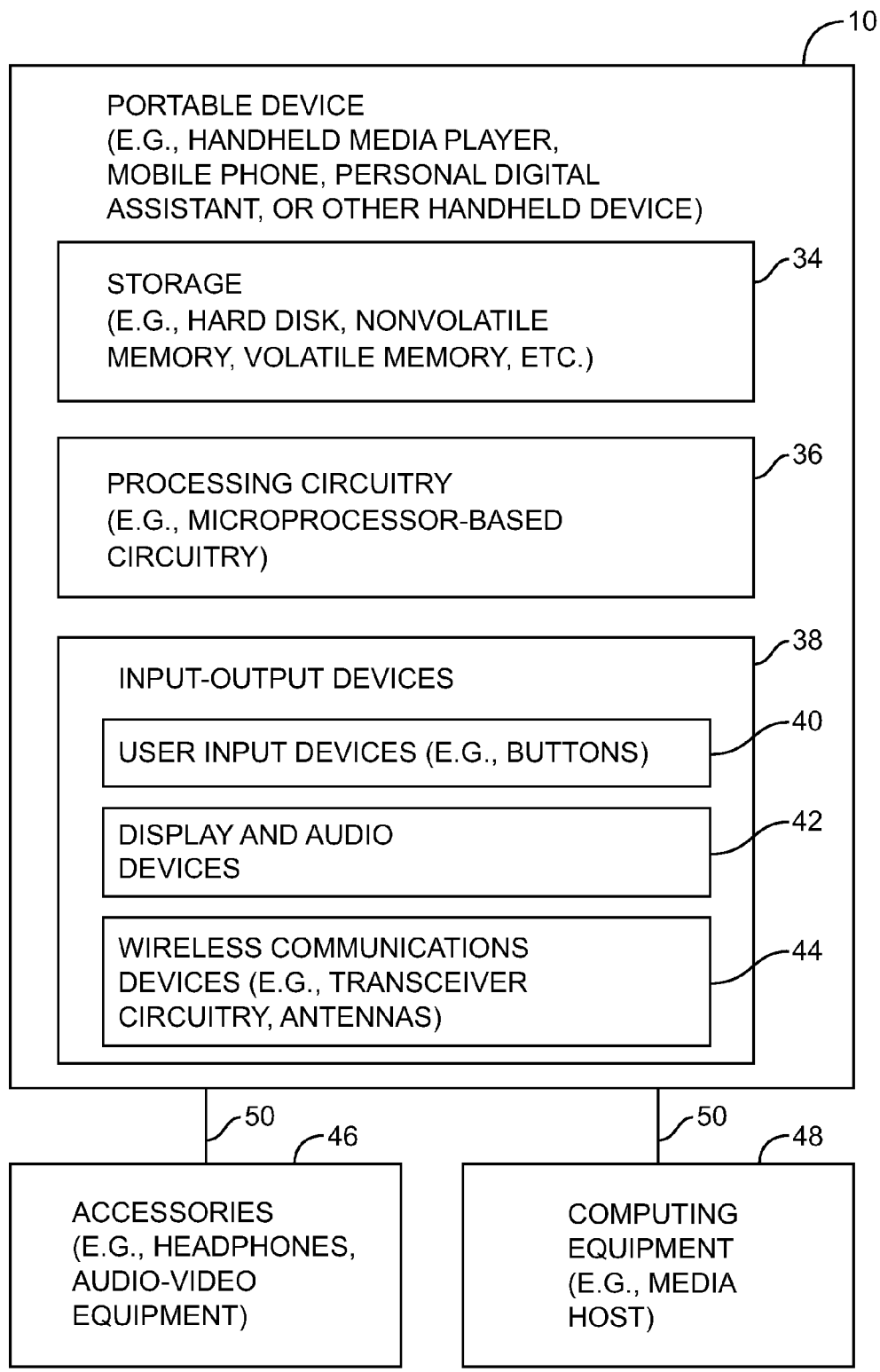
FIG. 2 is a schematic diagram of an illustrative electronic device in accordance with an embodiment of the present invention.

A schematic diagram of an embodiment of an illustrative electronic device is shown in FIG. 2. As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3G data services such as UMTS, Global Positioning System (GPS) protocols, cellular telephone communications protocols, etc.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications).

Device 10 can communicate with external devices such as accessories 46 and computing equipment 48, as shown by paths 50. Paths 50 may include wired and wireless paths. Accessories 46 may include headphones (e.g., a wireless cellular headset or audio headphones) and audio-video equipment (e.g., wireless speakers, a game controller, or other equipment that receives and plays audio and video content).

Computing equipment 48 may be any suitable computer. With one suitable arrangement, computing equipment 48 is a computer that has an associated wireless access point or an internal or external wireless card that establishes a wireless connection with device 10. The computer may be a server (e.g., an internet server), a local area network computer with or without internet access, a user's own personal computer, a peer device (e.g., another handheld electronic device 10), or any other suitable computing equipment.

Figure 3:
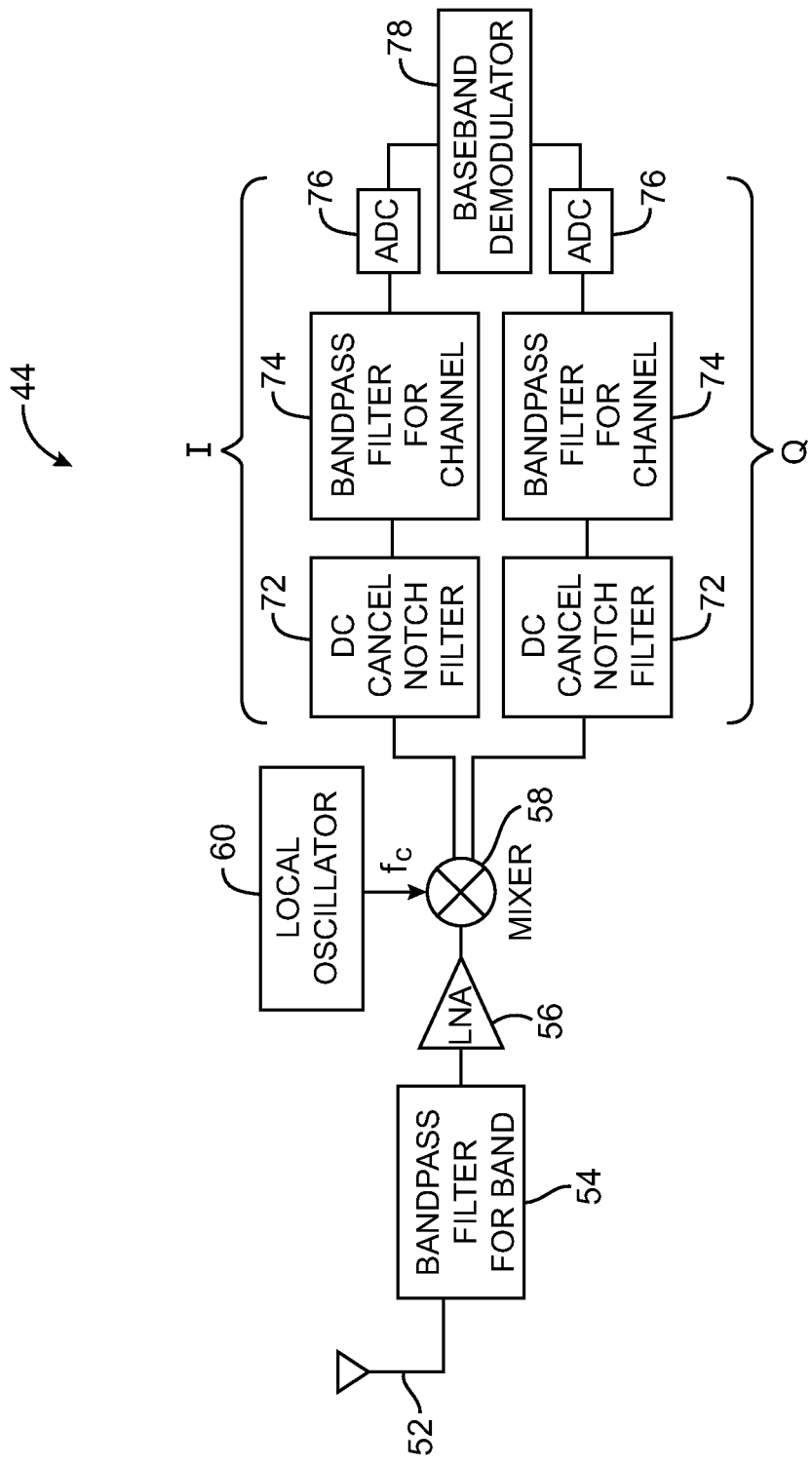
FIG. 3 is a circuit diagram of illustrative receiver circuitry in an electronic device in accordance with an embodiment of the present invention.

As shown in FIG. 3, wireless circuitry 44 may include direct conversion receiver circuitry for receiving radio-frequency antenna signals from antenna 52. Direct conversion receivers, which are sometimes referred to as homodyne receivers, convert signals from radio frequencies to baseband in a single mixing step (i.e., without first mixing the radio-frequency signal with an intermediate frequency before mixing again to baseband as in a super heterodyne receiver). Direct conversion receivers may be used, for example, in IEEE 802.11 communications.

Direct conversion receivers contain direct current (DC) notch filters that block the center of the received channel. This creates a "blind spot" that can be exploited to reduce the adverse effects of self interference. Self interference arises when a clock signal of a component in an electronic device or harmonics of the clock signal fall within a communications band of interest. In this type of situation, the radio-frequency signals that are produced by clocking the component serve as a source of undesirable interfering radio-frequency signals that can adversely affect the performance of a radio-frequency receiver that is handling the communications band of interest.

The interference signals that are associated with a clock are sometimes referred to as interferers. The radio-frequency receiver circuitry that is affected by the interfering signals is sometimes referred to as the victim receiver or victim. If care is not taken, the presence of an interferer within a communications band that is being received by a victim receiver can cause the victim receiver to perform poorly or to fail.

Because the direct conversion receiver of wireless circuitry 44 in FIG. 3 has a blind spot at its center frequency, the adverse affects of interference may be reduced or eliminated in device 10 by locating the frequency of the interferer in the blind spot. This technique may be performed by properly designing the circuitry of device 10 in advance or may be performed in real time by dynamically adjusting the locations of the interferers.

As shown in FIG. 3, wireless circuitry 44 has one or more antennas such as antenna 52 that receive radio-frequency signals. Band pass filter 54 serves as a band filter that blocks out-of-band radio-frequency signals (e.g., signals other than 2.4 GHz signals when circuitry 44 is operating in the 2.4 GHz IEEE 802.11 band). Low noise amplifier 56 amplifies the signals that have passed through band filter 54 and provides the amplified signals to mixer 58.

Local oscillator 60 may be based on a tunable phase-locked-loop circuit and may produce a radio-frequency signal in the center of a desired channel within the received communications band. The output of mixer 58, which is at baseband frequencies, is complex and includes real ("in-phase" or "I") and imaginary ("quadrature" or "Q") components which are processed by respective I and Q receiver branches, as shown in FIG. 3. Each circuit branch includes a DC notch filter 72, channel band pass filter, and analog-to-digital converter 76. Baseband demodulator 78 receives the outputs from analog-to-digital converters 76 and provides corresponding data to processing circuitry in device 10 (see, e.g., storage and processing circuitry 34 and 36 in FIG. 2).

The presence of DC notch filters 72 creates the blind spot at the center of the received channel. The way in which this can be used to reduce or eliminate signal interference from an interferer is illustrated in the graph of FIG. 4.

Figure 4:
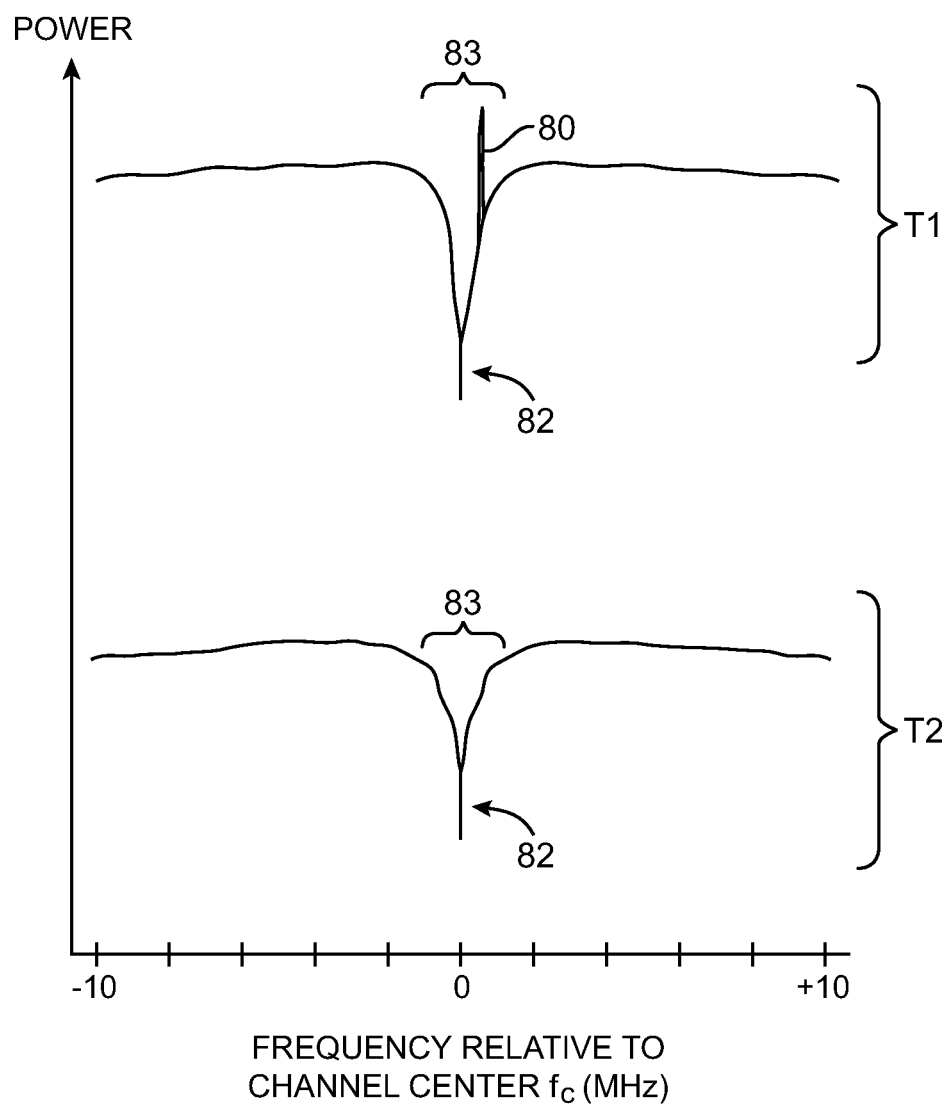
FIG. 4 is a graph showing how clock signals can be adjusted to shift the frequency of an interferer to a location at the center of a wireless communications band where the interferer is blocked by filter circuitry in the receiver in accordance with an embodiment of the present invention.

Upper trace T1 and lower trace T2 of FIG. 4 correspond to the performance of a direct conversion receiver in the presence of an interferer with a bandwidth of 100 kHz. The power spectra of FIG. 4 illustrate how a receiver that is tuned to a channel with center frequency $f_c$ exhibits good performance within channel bandwidth 83 about center frequency $f_c$. In upper trace T1, interferer 80 is located within channel 83 at a frequency other than center frequency $f_c$. In this location, interferer 80 will cause undesirable interference for the receiver. In lower trace T2, the interferer has been moved to coincide with center frequency $f_c$. As illustrated by feature 82 of trace T2, there is a strong drop in receiver sensitivity at frequencies of about $f_c$ due to the presence of DC notch filter circuitry 72 of FIG. 3. This reduced receiver sensitivity creates a blind spot centered at $f_c$ that blocks interferer 80. As shown in trace T2, the amplitude of interferer 80 is attenuated to such an extent that the interference from interferer 80 is negligible and is not visible within trace T2.

Interferers may be aligned with predetermined channel center frequencies $f_c$ (e.g., during the process of designing device 10) or may be aligned with center frequencies $f_c$ in real time. Control circuitry may be used in device 10 to make real time clock source adjustments. These clock adjustments control the fundamental and harmonics of the clocks and thereby adjust the frequencies of the interferers in device 10.

It is generally possible to make at least some desired clock adjustments without preventing device 10 from operating. Clock adjustments may be made to move interferers out of band (e.g., out of active channel 83 of FIG. 4) or, preferably, so that the interferers coincide with center frequency $f_c$. Moving an interferer at center frequency $f_c$ generally involves making less of a frequency adjustment to the clock source than moving an interferer to an out-of-channel location, thereby facilitating design and test operations and improving device performance by avoiding excessive frequency reductions.

Figure 5:
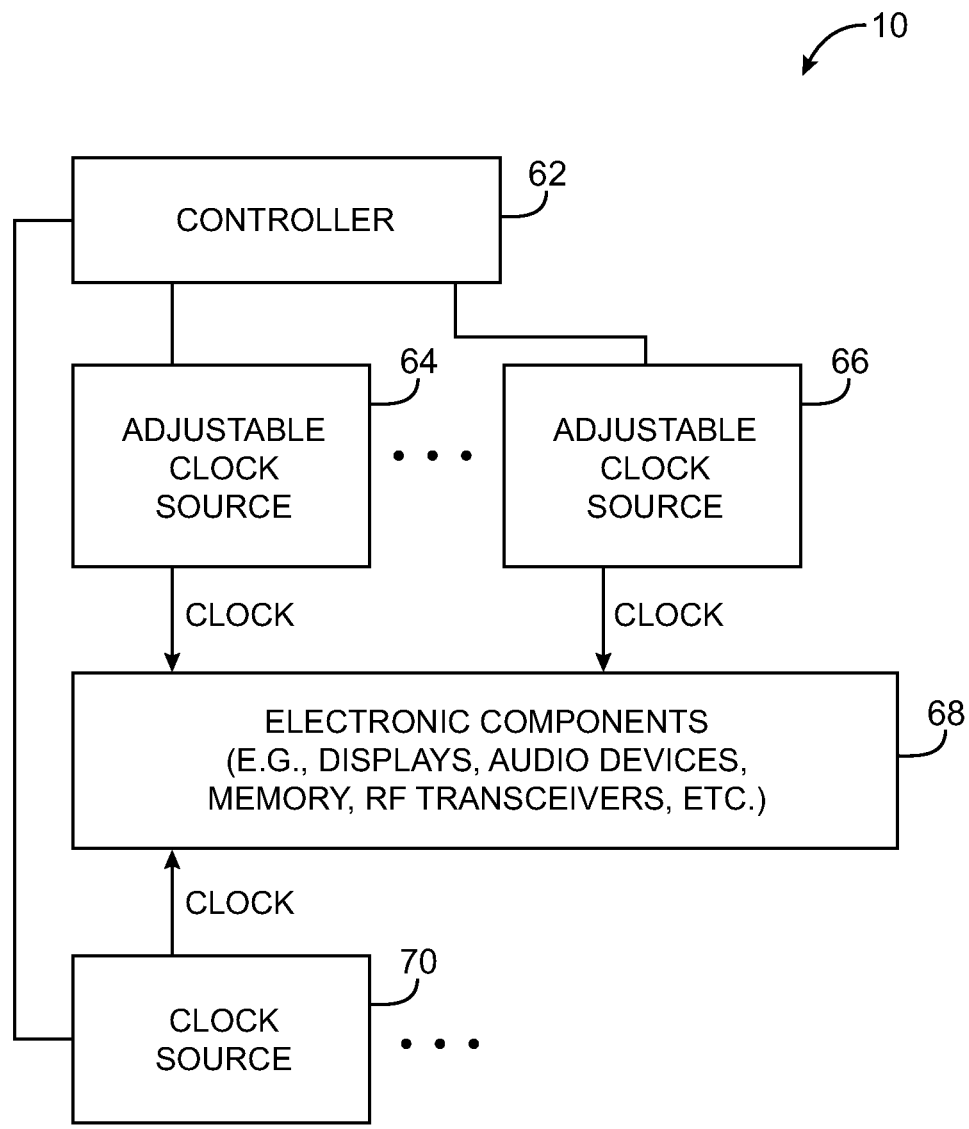
FIG. 5 is a diagram showing how clock sources in an electronic device may be adjusted in accordance with an embodiment of the present invention.

Illustrative circuitry that may be used in device 10 to control clock sources to help prevent undesirable interference between interferers and victim receivers is shown in FIG. 5. As shown in FIG. 5, device 10 may have a controller 62. Controller 62 may be implemented using hardware and/or software. For example, controller 62 may be implemented using processor 36 and storage 34 and other circuitry in FIG. 2 or may be implemented using more dedicated hardware. When controller 62 is implemented using software, the software may be stored on storage such as storage 34 of FIG. 2. When the software is run, the processing circuitry of device 10 such as processing circuitry 36 of FIG. 2 is configured to perform the clock adjustment control operations of controller 62.

Controller 62 may control clock sources such as clock source 64, 66, and 70. The amount of adjustability that is available for each clock source may vary.

For example, some clock sources (e.g., clock source 70) may only be capable of supplying a fixed output frequency. This output frequency may, for example, be a multiple of a reference clock input signal that is derived from a crystal oscillator or other oscillator circuit. With this type of configuration, controller 62 may be able to enable or disable the clock source as desired to avoid frequency collisions. However, this type of clock source does not have an adjustable frequency.

Other clock sources (e.g., adjustable clock source 64) may have a fixed clock modulation profile, but may have an adjustable fundamental frequency. Controller 62 may issue control signals for this type of clock source to adjust the fundamental frequency and/or to selectively enable or disable the clock source.

Still other clock sources (e.g., adjustable clock source 66) may have adjustable fundamental frequencies and adjustable modulation profiles (to spread the spectrum of the clock source). Controller 62 may selectively enable/disable this type of clock source, may adjust the fundamental clock signal frequency, and may apply a desired clock modulation profile to the clock source.

To ensure that a given interferer can be dynamically moved to a desired center frequency $f_c$, the clock source for the interferer is preferably formed using an adjustable clock source with an adjustable fundamental frequency (e.g., clock sources such as source 64). Adjustable clock sources of this type may be formed using crystal oscillators or other oscillators that feed an oscillator circuit such as a phase-locked-loop. The phase-locked loop may contain a voltage controlled oscillator. An adjustable divider circuit may be used to divide the output of the phase-locked loop (e.g., in part of a feedback path or in a separate output path). The phase-locked loop output or the output of a divider may be used as the output of the adjustable clock source. Controller 62 can produce control signals that adjust the output frequency of the clock source. The control signals may include analog control signals (e.g., voltage control signals for controlling the voltage controlled oscillator in the phase-locked loop) and, if desired, digital control signals (e.g., signals for controlling the setting of an adjustable divider). Control signals may be produced dynamically during the operation of device 10, so that the frequencies of interferers can be adjusted in real time to accommodate changes in which channels are being actively used by the receivers in device 10.

The clock sources of FIG. 5 generate clock signals at their outputs. These clocks are applied to electronic components 68 in device 10. Illustrative electronic components that use clock signals in device 10 include video circuits, displays, audio circuits, input-output devices, RF transceivers, etc.

The clock signals that are produced by the clock sources are labeled "CLOCK" in FIG. 5. These signals may be derived from one or more reference clock signals. The reference clock signals may be supplied by an oscillator that is mounted on the same circuit board or within the same housing as the other components in device 10 (as an example). A phase-locked-loop (PLL), delay-locked loop (DLL) or other suitable clock circuitry may be used to control each output signals CLOCK. In a typical scenario, the clock source circuitry is based on a PLL and contains one or more divider (multiplier) circuits. The divider circuits control the ratio of the output signal CLOCK relative to the input reference clock and thereby control the frequency of signal CLOCK. As an example, a reference clock input might have a frequency of 20 MHz. In a PLL with a divide-by-ten circuit in its feedback path, the clock signal output of the PLL would be multiplied by ten relative to the reference clock input to produce an output at a frequency of 200 MHz. When adjusting this type of clock source to move an interferer to the center of a receiver channel, the divide-by-ten circuit may be adjusted so that division by another integer is performed (e.g., so that the divider forms a divide-by-eleven circuit). In addition to this type of course frequency adjustment, finer frequency adjustments may be made by controlling the phase-locked loop circuit (e.g., by adjusting a voltage-controlled oscillator in a phase-locked-loop circuit).

Frequency adjustments to interferers may, in general, include both upward and downward adjustments in frequency. In some situations, upward frequency adjustments may not be permitted by device operating constraints, because the electrical component that is being driven by the interferer may already be operating at its maximum frequency. In this type of scenario, downwards frequency adjustments may be made.

Figure 6:
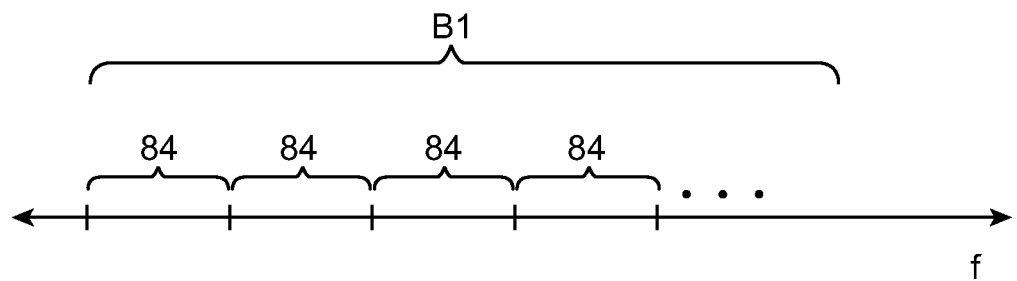
FIGS. 6 and 7 show how communications channels may be arranged in completely non-overlapping and partially non-overlapping configurations in accordance with an embodiment of the present invention.
Figure 7:
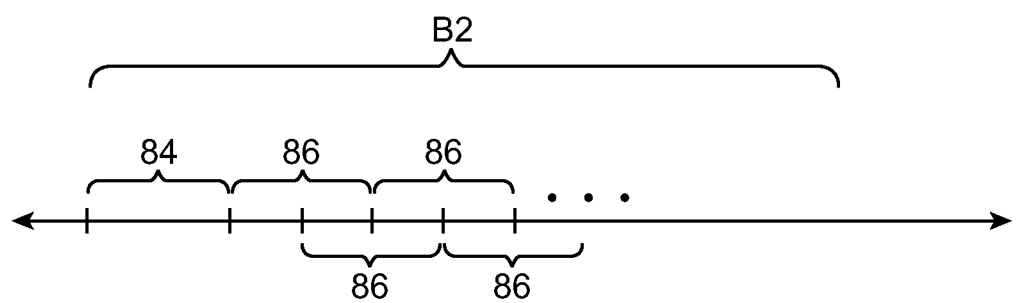

In some communications bands, channels do not overlap. This type of situation is shown in FIG. 6. As shown in FIG. 6, all of the channels 84 in band B1 are associated with unique ranges of frequencies and are non-overlapping. In other communications bands, such as communications band B2 of FIG. 7, channels may overlap. As shown in FIG. 7, some channels such as channel 84 may be non-overlapping and other channels such as channels 86 may overlap with adjacent channels. In the configuration of FIG. 7, no more than two channels overlap at any given frequency. This is merely illustrative. In practice, more than two channels may overlap at a particular frequency (e.g., in a configuration in which channels are staggered at frequency offsets of less than a half-channel bandwidth).

In bands that contain exclusively non-overlapping channels, an interferer may be moved to the nearest channel center, either by moving the interferer up in frequency (if permitted) or by moving the interfere down in frequency. In bands that contain overlapping channels, it may be desirable to move an interferer to one of the "safe" non-overlapping channels. This is because movement of an interferer to the nearest channel center in an overlapping channel might result in a situation in which the interferer is not moved sufficiently and continues to interfere with the active channel.

It is generally desirable to minimize the amount of frequency shift when adjusting interferer frequencies. Large increases in interferer frequency may not be advisable because this may increase the risk of device failure. Large decreases in interferer frequency may result in excessive losses in performance.

Figure 8:
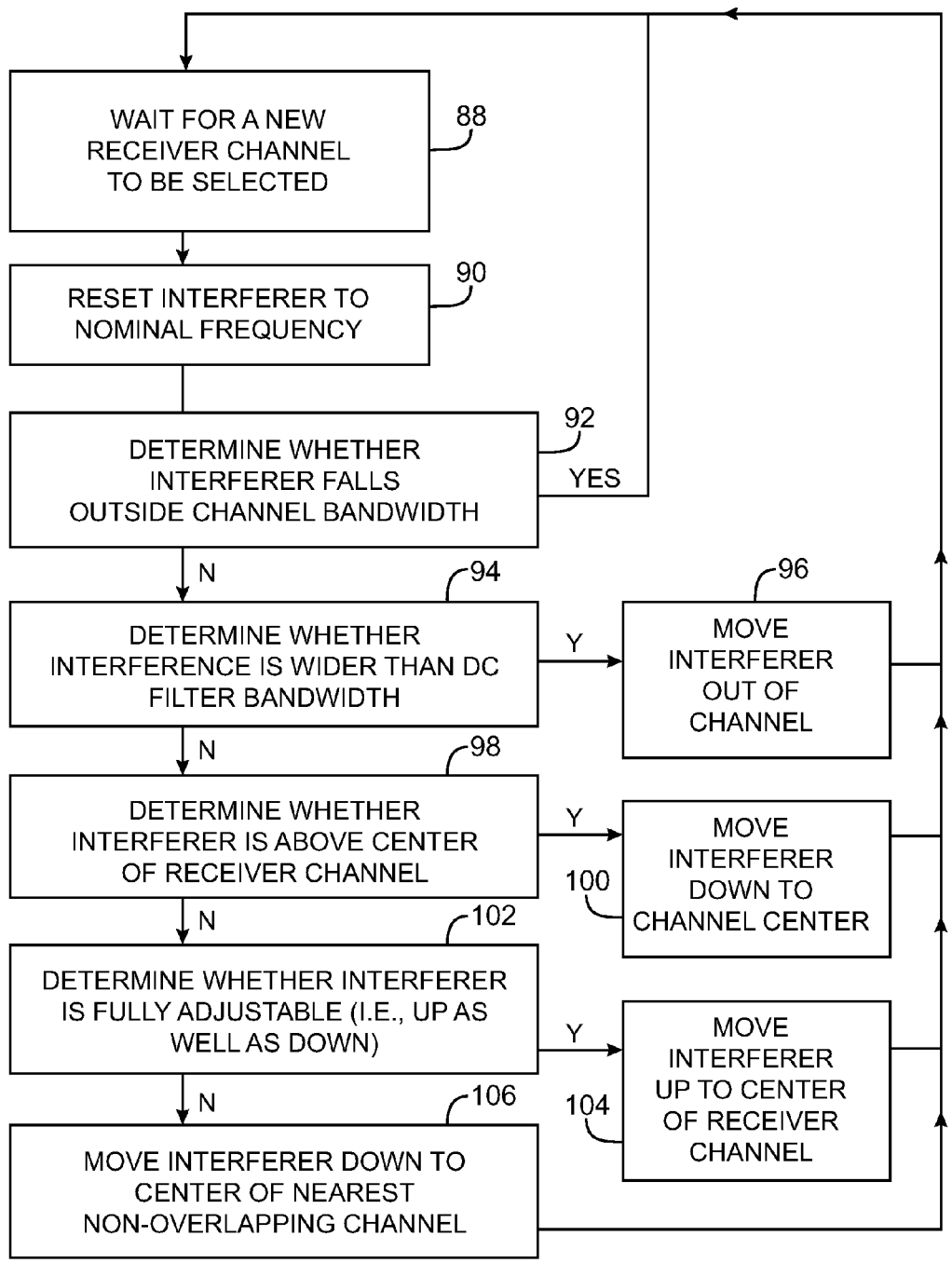
FIG. 8 is a flow chart of illustrative steps involved in making clock signal adjustments to reduce harmful interference between an interferer and a victim receiver in an electronic device in accordance with an embodiment of the present invention.

A flow chart of illustrative steps that may be used in controlling the frequencies of interferers during operation of device 10 is shown in FIG. 8. The operations of FIG. 8 may be used to control interferer frequencies in bands that contain only non-overlapping channels and in bands that contain overlapping channels and may be used to minimize interferer frequency shifts.

At step 88, control circuitry such as controller 62 of FIG. 5 may wait for a new communications channel for a direct conversion receiver such as the receiver of FIG. 3 to be selected. Controller 62, which may be implemented using hardware, software, or a combination of hardware and software (e.g., storage 34 and processing circuitry 36 of FIG. 2), may be used in monitoring and controlling the receiver circuitry of device 10 (i.e., the victims) and in controlling the clock sources that produce interference (i.e., the interferers). The active channel that is selected by controller 62 at step 88 may be, for example, one of the channels in an IEEE 802.11 local area network that the receiver can use to receive wireless local area network data.

After the channel has been selected, controller 62 may reset the interferer to a nominal operating frequency (step 90). The nominal operating frequency may be a predetermined frequency that lies in a channel center or out of a channel center. The process of step 90 and the other operations of FIG. 8 may take into account both fundamental clock frequencies and harmonics. The steps involved in moving a single interferer are sometimes described in FIG. 8 for clarity, but, in general, any suitable number of interferers may be moved if desired.

At step 92, controller 62 may determine whether the nominal operating frequency of the controller lies within the current channel or falls outside of the channel. If the interfering frequencies produced by the interferer fall outside of the channel, the interferer will not cause undesirable interference for the receiver, so processing may loop back to step 88.

If, however, the interferer lies within the current channel, controller 62 may determine whether the interference produced by the interferer is wider than the DC filter bandwidth produced by notch filter circuitry 72 of FIG. 3. If, for example, the notch filter bandwidth is 200 kHz, but the interferer has a bandwidth of 500 kHz, it may not be possible to completely eliminate interference by locating the interferer at a channel center. In this situation, the interferer may be moved out of the channel at step 96. If it is determined during the operations of step 94 that the interference of the interferer is less than the notch filter bandwidth, processing may proceed to step 98.

During the operations of step 98, controller 62 may determine whether the interferer is located above the center of the receiver channel. If the interferer is located above the center frequency of the channel, controller 62 may move the interferer down to the center frequency of the channel at step 100. In this configuration, the frequency of the interferer is equal to that of the center frequency. Aligning the interferer with the center frequency in this way aligns the interference signals from the interferer with the corresponding notch filter circuitry in the receiver of device 10. The notch filter circuitry can then attenuate the interference signals. If the interferer is not located above the center frequency of the channel, processing may proceed to step 102.

During the operations of step 102, controller 62 may determine whether operating constraints for the electronic device permit the interferer to be adjusted both up and down in frequency. With some interferers, upwards adjustments may not be permissible, because doing so would cause the components that are driven by the clocks associated with the interferers to exceed permissible operating limits. If it is determined that it is permissible to move the interferer both upwards and downwards in frequency without violating permissible operating limits for components that are driven by the interferers, controller 62 can move the interferer up in frequency to the center frequency of the channel at step 104. If, during the operations of step 102, it was determined that it is not permissible to increase the frequency of the interferer without violating electronic device operating constraints, processing may proceed to step 106.

At step 106, controller 62 may move the interferer down to the center of the nearest non-overlapping channel.

In situations in which all channels in the communications band are non-overlapping, controller 62 can move the interferer frequency down to the center of the nearest possible channel. If, for example, the interferer was located at a frequency above the center of the current channel, controller 62 can move the interferer down to the center of the current channel. If the interferer was located at a frequency below the center of the current channel, controller 62 can move the interferer down to a location that is outside of the current channel. With one suitable arrangement, the interferer is moved just outside of the lower channel boundary to minimize the magnitude of the change in the interferer frequency. With another suitable arrangement, the interferer is moved to the center of the next lowest channel (i.e., the channel immediately below the current channel). In situations in which some of the channels are overlapping and some of the channels are not overlapping, controller 62 can move an interferer that is located at a frequency below the center of the current channel down to the center of the nearest non-overlapping channel. The center of the nearest non-overlapping channel may be considered a safe location for the interferer, because an interferer in this location will be blocked by the DC notch filter circuitry (i.e., when this non-overlapping channel is used as the active channel) or will at least not be located within any active nearby channels due to the non-overlapping nature of the non-overlapping channel.

Following successful operations in steps 96, 100, 104, and 106, processing may loop back to step 88. Each time a new channel is selected (step 88), the operation of FIG. 8 may be repeated in real time to dynamically select an appropriate location for the interferer.

The foregoing is merely illustrative of the principles of this invention and various modifications can be made by those skilled in the art without departing from the scope and spirit of the invention.

What is claimed is:

1. A method for reducing radio-frequency interference in an electronic device that has at least one radio-frequency receiver that receives radio-frequency antenna signals in a communications channel having a center frequency and that has at least one adjustable clock source that produces an interference signal at an interferer frequency, comprising:
    with control circuitry in the electronic device, adjusting the clock source in real time to align the interferer frequency with the center frequency.

2. The method defined in claim 1 further comprising determining when the radio-frequency receiver is operating in a new channel with a new center frequency and, in response to determining that the radio-frequency receiver is operating in the new channel, adjusting the clock source with the control circuitry to align the interferer frequency with the new center frequency.

3. The method defined in claim 1 wherein the radio-frequency receiver comprises a direct conversion receiver having a direct-current (DC) notch filter, the method further comprising:
    with the control circuitry, determining whether the interference signal has a bandwidth wider than the DC notch filter.

4. The method defined in claim 3 further comprising:
    in response to determining that the interference signal has a bandwidth wider than the DC notch filter, adjusting the clock source with the control circuitry to move the interferer frequency out of the current channel.

5. The method defined in claim 1 further comprising:
    determining whether the interferer frequency is located above the center frequency using the control circuitry; and
    in response to determining that the interferer frequency is located above the center frequency, adjusting the clock source downwards in frequency to align the interferer frequency with the center frequency.

6. The method defined in claim 1 further comprising:
before adjusting the clock source, determining whether operating constraints for the electronic device permit the interferer frequency to be adjusted upwards.

7. The method defined in claim 6 wherein adjusting the clock source in real time to align the interferer frequency with the center frequency comprises adjusting the clock source downwards in frequency in response to determining that the operating constraints for the electronic device prevent the interferer frequency from being adjusted upwards.

8. The method defined in claim 6 wherein adjusting the clock source in real time to align the interferer frequency with the center frequency comprises adjusting the clock source downwards in frequency in response to determining that the operating constraints for the electronic device prevent the interferer frequency from being adjusted upwards and wherein the communications channel comprises a non-overlapping communications channel.

9. The method defined in claim 6 wherein adjusting the clock source in real time to align the interferer frequency with the center frequency comprises adjusting the clock source downwards in frequency in response to determining that the operating constraints for the electronic device prevent the interferer frequency from being adjusted upwards and wherein the communications channel comprises a non-overlapping communications channel in a communications band that contains both non-overlapping communications channels and overlapping communications channels.

10. An electronic device comprising:
wireless communications circuitry that operates in at least one communications channel having a center frequency;
at least one adjustable clock source that gives rise to an associated interference signal having an interferer frequency; and
circuitry that dynamically adjusts the clock source until the interferer frequency equals the center frequency.

11. The electronic device defined in claim 10 further comprising a receiver that receives radio-frequency signals in the communications channel.

12. The electronic device defined in claim 11 wherein the receiver comprises a notch filter that attenuates signals at the center frequency.

13. The electronic device defined in claim 11 further comprising an antenna, wherein the receiver comprises a direct conversion receiver that is coupled to the antenna and that has notch filter that attenuates signals at the center frequency.

14. The electronic device defined in claim 11 wherein the circuitry is configured to adjust the receiver to change the communications channel during operation of the electronic device and wherein the circuitry is configured to adjust the clock circuitry to move the interference frequency to the center frequency whenever the communications channel is changed during operation of the electronic device.

15. The electronic device defined in claim 14 wherein the receiver comprises a notch filter that attenuates signals at the center frequency.

\* \* \* \* \*